United States Patent Office.

HENRY GERNER, OF NEW YORK, N. Y., ASSIGNOR TO HEVEENOID MANUFACTURING COMPANY, OF SAME PLACE.

MANUFACTURE OF VULCANIZED INDIA-RUBBER COMPOUNDS.

SPECIFICATION forming part of Letters Patent No. 229,038, dated June 22, 1880.

Application filed April 9, 1880. (No specimens.)

*To all whom it may concern:*

Be it known that I, HENRY GERNER, of the city of New York, in the county and State of New York, have invented certain new and useful Improvements in the Manufacture of Vulcanized India-Rubber Compounds called "Heveenoid," of which the following is a full, clear, and exact description, sufficient to enable others skilled in the art to practice my invention, the said improvements not having been to my knowledge heretofore patented in any foreign country.

My present invention is an improvement upon that described and claimed in the United States Letters Patent issued to me bearing date March 30, 1880, and numbered 226,058, wherein a certain product, now commonly known as "heveenoid," is first alluded to. This product has for its base india-rubber, whence the name "heveenoid," from "*heveen*," as the natives of South America denominate the milky juice of the india-rubber tree, and "*oid*," a Greek termination signifying "like." The combination of this base with camphor and sulphur, as first pointed out in the Letters Patent above referred to, constitutes the product heveenoid.

The object of my invention is to improve and cheapen the manufacture of goods in which india-rubber is an ingredient, and to make them susceptible of receiving various shades and colors; and to this end my invention consists in a certain new and improved compound or species of heveenoid, and in certain methods or processes in its manufacture, all of which will be hereinafter first fully described, and then pointed out in the claims.

It is well known that there has been found no body other than sulphur which will cure or vulcanize india-rubber, and that this discovery of Goodyear's first made india-rubber useful in the industrial arts; but sulphur only in a very limited degree combines with india-rubber, and can only be used in limited quantities in the vulcanization of both hard and soft india-rubber goods. In the latter an efflorescence of sulphur always takes place, owing to the imperfect chemical combination. When, on the contrary, camphor is mixed with india-rubber and sulphur and the mixture is properly vulcanized, it is found that the chemical combination is not only perfected, but that a vastly greater quantity of sulphur may be used, by which the expense of production is greatly diminished and a valuable and heretofore unknown compound is produced, which is of a quality superior to the ordinary india-rubber compound.

There are various details of manipulation by which camphor may be properly incorporated with india-rubber and sulphur, all of which, however, are comprehended in my improved process, and are within the principles of my invention, and result in one and the same product.

Of these, first, camphor is melted by the aid of heat in a closed vessel, is poured on sulphur, and is stirred together with it. The mixture is then allowed to cool, is ground and converted into an impalpable powder, which process is materially facilitated by moistening the mixture with either naphtha, gasoline, benzine, &c. This powder is then incorporated with india-rubber in any practical manner.

Second. Camphor and sulphur are melted together by the aid of heat in a closed vessel. The fused mass is allowed to cool, and ground and used as before.

Third. Camphor is dissolved in either alcohol, naphtha, gasoline, benzine, &c., and the solution poured on and mixed with sulphur and such substances as are to be incorporated with the mixture. The solvent is then evaporated, and the product ground and used as before.

Fourth. Camphor is melted by the aid of heat in a closed vessel. In this fused mass is immersed india-rubber and sulphur in quantities sufficient to produce a paste which will not harden when cold; or, instead of india-rubber and sulphur, vulcanized or unvulcanized india-rubber, hard or soft, may be employed. This paste is then incorporated with a sufficient quantity of sulphur in any practical manner.

Fifth. In any solution in which india-rubber is dissolved camphor may be dissolved at the same time, and by adding sulphur to this solution and the solvent being evaporated a mixture is obtained from which heveenoid may be manufactured.

Sixth. Camphor and sulphur are mixed together on mixing-rollers, and the mixed product is ground in suitable mills to the required degree of fineness together with such other substances as it may be desired to incorporate with the same. The resultant mixture is then incorporated with india-rubber, as before.

Seventh. India-rubber is incorporated with sulphur as generally practiced. When a greater amount of sulphur than is usually employed is thus incorporated with the india-rubber the product will be too hard and brittle; but when this product, either before or after vulcanization, is immersed in molten camphor during a sufficient period of time, the product, having entered into combination with a certain amount of the camphor, acquires toughness and flexibility and becomes a desirable material. In other words, it becomes heveenoid.

But I do not limit myself to any of the above specified manipulations. The mixture of camphor with india-rubber and sulphur by any method whatever, the whole being afterward properly vulcanized, constitutes the radical feature of my invention.

I have ascertained by repeated experiment that for the manufacture of soft heveenoid double the quantity or more of sulphur may be employed than in the manufacture of soft vulcanized india-rubber. If no more sulphur should be employed in the heveenoid process than is employed in the ordinary india-rubber process, the product would not be properly vulcanized; but the amount of sulphur varies with the proportion of camphor to india-rubber. A greater proportion of camphor to india-rubber requires more sulphur in the mixture, and, vice versa, a lesser proportion of camphor to india-rubber requires less sulphur in the mixture; but, under all circumstances, in the manufacture of soft heveenoid a vastly greater amount of sulphur is needed than in the manufacture of soft vulcanized india-rubber.

In the manufacture of hard heveenoid the same, in general, holds good that has been said of soft heveenoid. It is only to be observed that the proportion of the quantity of sulphur to camphor and india-rubber is much greater than in the manufacture of soft heveenoid. The actual quantity of sulphur to be used depends upon the proportion of camphor to india-rubber in the mixture.

As regards the temperature of vulcanization, I have found that a greater degree of heat is required to properly vulcanize the heveenoid compound than is required to vulcanize the ordinary india-rubber compound. A temperature of 312° to 320° Fahrenheit as the highest point may be safely employed.

I have also found that it takes a shorter space of time to properly vulcanize the heveenoid compound than it takes to vulcanize the india-rubber compound. The length of time required depends upon a number of circumstances, including the proportion of the composite parts of the mixture and the required nature of the product.

The raising of the temperature should be conducted cautiously, and it will be safe, under most circumstances, to consume from three to four hours in gradually raising the temperature to the required maximum point, after which, as a rule, only two or three hours more will be required to properly vulcanize the product.

The difference in time between the vulcanization of the hard india-rubber and heveenoid compounds will be seen from the fact that the former requires thirteen hours for its proper vulcanization.

I wish it to be clearly understood that wherever in this specification and claims I make use of the term "india-rubber" I mean india-rubber or an analogous gum; also, wherever in this specification and claims I make use of the term "camphor" I mean camphor both natural and artificial, crude and refined, and the gums or resins which are analogous to camphor, and camphor in any of its chemical combinations; lastly, wherever in this specification and claims I make use of the term "sulphur" I mean either sulphur alone or sulphur in any of its chemical combinations with the metals and other inorganic or organic substances.

I have found that when a certain quantity of glycerine is incorporated with the mixture for the manufacture of both hard and soft heveenoid a very desirable product is realized. The actual quantity of glycerine to be employed depends, in a measure, upon the proportion of india-rubber to camphor. When a greater proportion of india-rubber to camphor is used in the mixture a greater quantity of glycerine will act beneficially, and, vice versa, when a greater proportion of camphor to india-rubber is used a less quantity of glycerine may be employed.

I have also found that any and all substances which can be advantageously incorporated with the mixture for the manufacture of any class of ordinary vulcanized india-rubber can also be advantageously incorporated with the mixture for the manufacture of heveenoid. It is a matter of experience that the heveenoid compound will take up a much greater quantity of such admixtures than the ordinary india-rubber compound will.

Having now fully described my invention, what I claim as new, and desire to secure by Letters Patent, is—

1. In the manufacture of hard heveenoid, the hereinbefore-described process of mixing india-rubber and camphor with sulphur, in which mixture the quantity of sulphur is determined, first, by the quantity of india-rubber in the mixture, the quantity of sulphur being in the usual proportion to the quantity of india-rubber in the mixture, and, secondly, by the quantity of camphor in the mixture, the quantity of sulphur being in an equal or greater proportion to the quantity of camphor in the mixture, and then properly vulcanizing the mixture, substantially as set forth.

2. In the manufacture of soft heveenoid, the hereinbefore-described process of mixing india-rubber and camphor with sulphur, in which mixture the quantity of sulphur is determined, first, by the quantity of india-rubber in the mixture, the quantity of sulphur being in the usual proportion to the quantity of india-rubber in the mixture, and, secondly, by the quantity of camphor in the mixture, the quantity of sulphur being the same as or greater than in the above proportion in proportion to the quantity of camphor in the mixture, and then properly vulcanizing the mixture, substantially as set forth.

3. In the manufacture of heveenoid, the hereinbefore-described process of mixing glycerine with a combination of india-rubber, camphor, and sulphur, and then properly vulcanizing the mixture, substantially as set forth.

4. In the manufacture of heveenoid, the hereinbefore-described process of mixing india-rubber, camphor, and sulphur, with or without glycerine, and any substance which can be advantageously incorporated with the same for the manufacture of any class of ordinary vulcanized india-rubber, and then properly vulcanizing the mixture, substantially as described, and for the purpose set forth.

5. The hereinbefore-described improved product, or heveenoid, composed of india-rubber, camphor, sulphur, glycerine, and foreign admixtures, all properly united and vulcanized, substantially as hereinbefore set forth.

In testimony that I claim the foregoing I have hereunto set my hand in the presence of two witnesses.

HENRY GERNER.

Witnesses:
M. DITTENHOEFER,
RICHARD GERNER.